United States Patent
Lotero et al.

(10) Patent No.: US 8,846,992 B2
(45) Date of Patent: Sep. 30, 2014

(54) PROCESS FOR CONVERTING BIOMASS TO HYDROCARBONS AND OXYGENATES

(75) Inventors: Edgar Lotero, Cleveland, OK (US); Alexandru Platon, Bartlesville, OK (US); Daren E. Daugaard, Skiatook, OK (US); Kristi Fjare, Bartlesville, OK (US)

(73) Assignee: Philips 66 Company, Houston, TX (US)

( * ) Notice: Subject to any disclaimer, the term of this patent is extended or adjusted under 35 U.S.C. 154(b) by 907 days.

(21) Appl. No.: 12/958,027

(22) Filed: Dec. 1, 2010

(65) Prior Publication Data

US 2011/0144396 A1    Jun. 16, 2011

Related U.S. Application Data

(60) Provisional application No. 61/286,596, filed on Dec. 15, 2009.

(51) Int. Cl.
*C07C 1/00* (2006.01)
*C10G 1/00* (2006.01)

(52) U.S. Cl.
CPC . *C10G 1/00* (2013.01); *Y02E 50/13* (2013.01); *C10G 1/002* (2013.01); *C10G 2300/1014* (2013.01); *C10G 2300/44* (2013.01)
USPC ............... 585/240; 44/605; 44/606

(58) Field of Classification Search
USPC ........ 585/240, 242; 201/2.5, 21, 36; 202/105; 44/605, 606
See application file for complete search history.

(56) References Cited

U.S. PATENT DOCUMENTS

| | | | |
|---|---|---|---|
| 4,447,963 A | 5/1984 | Petersson | |
| 4,670,613 A | 6/1987 | Ruyter et al. | |
| 5,959,167 A * | 9/1999 | Shabtai et al. | 585/242 |
| 6,555,350 B2 | 4/2003 | Ahring et al. | |
| 7,262,331 B2 * | 8/2007 | van de Beld et al. | 585/240 |
| 8,288,600 B2 * | 10/2012 | Bartek et al. | 585/240 |
| 2003/0115792 A1 * | 6/2003 | Shabtai et al. | 44/605 |
| 2007/0215300 A1 | 9/2007 | Upfal et al. | |
| 2008/0312346 A1 | 12/2008 | McCall et al. | |
| 2008/0312479 A1 * | 12/2008 | McCall et al. | 585/240 |
| 2009/0017513 A1 | 1/2009 | Bell et al. | |
| 2009/0056201 A1 | 3/2009 | Morgan | |

(Continued)

FOREIGN PATENT DOCUMENTS

CA    1201080    *    2/1986

OTHER PUBLICATIONS

PCT/US1058760 PCT International Search Report and Written Opinion (PCT/ISA/220) Dated Feb. 23, 2011.

(Continued)

*Primary Examiner* — Nina Bhat
(74) *Attorney, Agent, or Firm* — Phillips 66 Company

(57) ABSTRACT

A process for converting biomass to hydrocarbons and oxygenates that may include providing a biomass feedstock and de-oxygenating the biomass feedstock to form a solid-intermediate. The process may further include liquefaction of the solid intermediate, which may be carried out either by rapid heating followed by condensation or by liquefying by applying high pressure. The liquefaction of the solid intermediate may produce a mixture of hydrocarbons and oxygenates, which is generally termed as biocrude. Further, the biocrude is processed by one or more refining means for production of hydrocarbons that can be used as fuel.

26 Claims, 2 Drawing Sheets

(56) References Cited

U.S. PATENT DOCUMENTS

| | | | |
|---|---|---|---|
| 2009/0069610 A1 | 3/2009 | Roberts, IV et al. |
| 2009/0090046 A1 | 4/2009 | O'Connor et al. |
| 2009/0176286 A1 | 7/2009 | O'Connor et al. |
| 2009/0182064 A1 | 7/2009 | Griffin |
| 2009/0229173 A1 | 9/2009 | Gosling |
| 2009/0253947 A1 | 10/2009 | Brandvold et al. |

OTHER PUBLICATIONS

Lignocellulosic biomass processing: A perspective by Michael Knauf* and Mohammed Moniruzzaman International Sugar Journal 2004, vol. 106, No. 1263 (p. 147-50).

Lignocellulosic Biomass to Ethanol Process Design and Economics Utilizing Co-Current Dilute Acid Prehydrolysis and Enzymatic Hydrolysis for Corn Stover. A Aden, M. Ruth, K. Ibsen, J. Jechura, K. Neeves, J. Sheehan, and B. Wallace. National Renewable Energy Laboratory, L. Montague, A. Slayton, and J. Lukas Harris Group Seattle, Washington, Jun. 2002 NREL/TP 510-32438.

Fractionation of Lignocellulosic Biomass for Fuel-Grade Ethanol Production (WRI-02-R019), Oct. 2002.

Producing Fuels and Chemicals from Lignocellulosic Biomass (SBE Special Section Biofuels S10-S18).

New Pretreatment Method for Biofuels Production From Lignocellulosic Biomass Yulin Deng, School of chemical and bio-molecular Engineering, Georgia Institute of Technology, 500, 10th St. N.W., Atlanta, GA 30332 and Yulin Zhao, Georgia Institute of Technology, 500, 10th St. N.W., Atlanta, GA 30332.

* cited by examiner

PROCESS FOR CONVERTING BIOMASS TO HYDROCARBONS AND OXYGENATES

CROSS-REFERENCE TO RELATED APPLICATIONS

This application is a non-provisional application which claims benefit under 35 USC §119(e) to U.S. Provisional Application Ser. No. 61/286,596 filed Dec. 15, 2009, entitled "PROCESS FOR CONVERTING BIOMASS TO HYDROCARBONS AND OXYGENATES" which is incorporated herein in their entirety.

STATEMENT OF FEDERALLY SPONSORED RESEARCH

None

FIELD OF THE DISCLOSURE

The invention relates generally to a process of processing biomass. More specifically, the invention relates to a process of converting biomass feedstock to produce hydrocarbons and oxygenates.

BACKGROUND OF THE DISCLOSURE

Non-petroleum-based, liquid transportation fuels may provide economic, security and environmental benefits. An example of non-petroleum based source is biomass. Liquid fuels derived from biomass are entering the market, driven by factors such as, but not limited to, oil price spikes and need for increased energy security. Further, due to government legislation requiring higher Renewable Fuels Standards (RFS), there is an increasing need for liquid fuels derived from biomass that may be fungible at high concentrations with current transportation fuels.

The examples of liquid fuels derived from biomass may include, but are not limited to, ethanol and biodiesel.

Ethanol may be directly used in blends with gasoline up to 10 v/v % blends in the United States. However, Ethanol content higher than 15% in the blends with gasoline may cause unacceptable corrosion in both blending equipment and consumer cars that are not especially equipped to deal with ethanol.

Biodiesel is also a widespread fuel which may be used as a diesel substitute. Some states in the United States already require biodiesel/diesel blends of up to 2% biodiesel. "Bio-Diesel" is one such product that may be produced by subjecting a base vegetable oil to a transesterification process using methanol to convert the base oil to desired methyl esters. After processing, the products have very similar combustion properties as compared to petroleum-derived hydrocarbons. However, Biodiesel may present engine plugging problems when used at very low temperatures, in winter, due to unfavorable cold flow properties. Biodiesel may also present storage and stability problems; e.g., fatty esters can undergo hydrolysis reactions increasing the acidity of the fuel and, hence, its corrosiveness. Further, biodiesel may also present poor oxidative stability, propensity to gel in cold climates, and higher cost. Further, bacterial growth may take place on biodiesel during long storage periods.

Unmodified vegetable oils and fats have also been used as additives in diesel fuel to lower cost and improve the lubricity of the fuel. However, problems such as injector coking and the degradation of combustion chamber conditions have been associated with these unmodified additives.

Processes for converting vegetable oil into hydrocarbons have been developed. However, these processes have often involved harsh reaction conditions, or the products from the reaction exhibit undesirable properties (such as high pour and cloud points) which render them unsuitable for use in diesel fuel. Further, these processes require significant quantities of hydrogen which increases the overall cost of producing the fuel.

As such, development of a new process of converting biomass to renewable hydrocarbon that would overcome the issue of corrosion, storage and stability could be a significant contribution to the art and to the economy.

BRIEF DESCRIPTION OF THE DISCLOSURE

The present invention relates to a process for converting biomass to hydrocarbons and oxygenates. The process may include providing a biomass feedstock and de-oxygenating the biomass feedstock to form a solid-intermediate. The process may further include liquefaction of the solid intermediate, which may be carried out either by rapid heating followed by condensation or by applying high pressure. The liquefaction of the solid intermediate may produce a mixture of hydrocarbons and oxygenates, which is generally termed as biocrude. Further, the biocrude is processed by one or more refining means for production of hydrocarbons that can be used as fuel.

In one embodiment, there is provided a process comprising steps of a) providing a biomass feedstock; b) de-oxygenating the biomass feedstock to form a solid-intermediate; and c) liquefying the solid-intermediate to produce a biocrude.

In another embodiment, there is provided a process comprising steps of a) providing a biomass feedstock; b) de-oxygenating the biomass feedstock to form a solid-intermediate; c) heating the solid-intermediate from step b to produce one or more volatile gases; and d) quenching to condense the one or more volatile gases thereby generating a biocrude.

In another embodiment, there is provided a process comprising steps of a) providing a biomass feedstock; b) de-oxygenating the biomass feedstock to form a solid-intermediate; c) heating a catalyst and the solid-intermediate from step b to produce one or more volatile gases; and d) quenching to condense the one or more volatile gases thereby generating a biocrude.

Other objects, advantages and embodiments of the invention will be apparent from the following detailed description of the invention and the appended claims.

DETAILED DESCRIPTION OF EMBODIMENTS OF THE INVENTION

The present invention relates to a process for processing biomass to produce hydrocarbons and oxygenates. The hydrocarbons produced could be used as renewable fuels. The hydrocarbons could be used as stand alone fuels or in blends with conventional fuels such as gasoline and diesel. The process may include de-oxygenating the biomass feedstock to form a solid-intermediate and further liquefying the solid intermediate to biocrude. The biocrude may be processed by one or more convention refining means to generate one or more hydrocarbons that may be used as fuels or in blends with conventional fuels such as gasoline or diesel.

Figure 1:
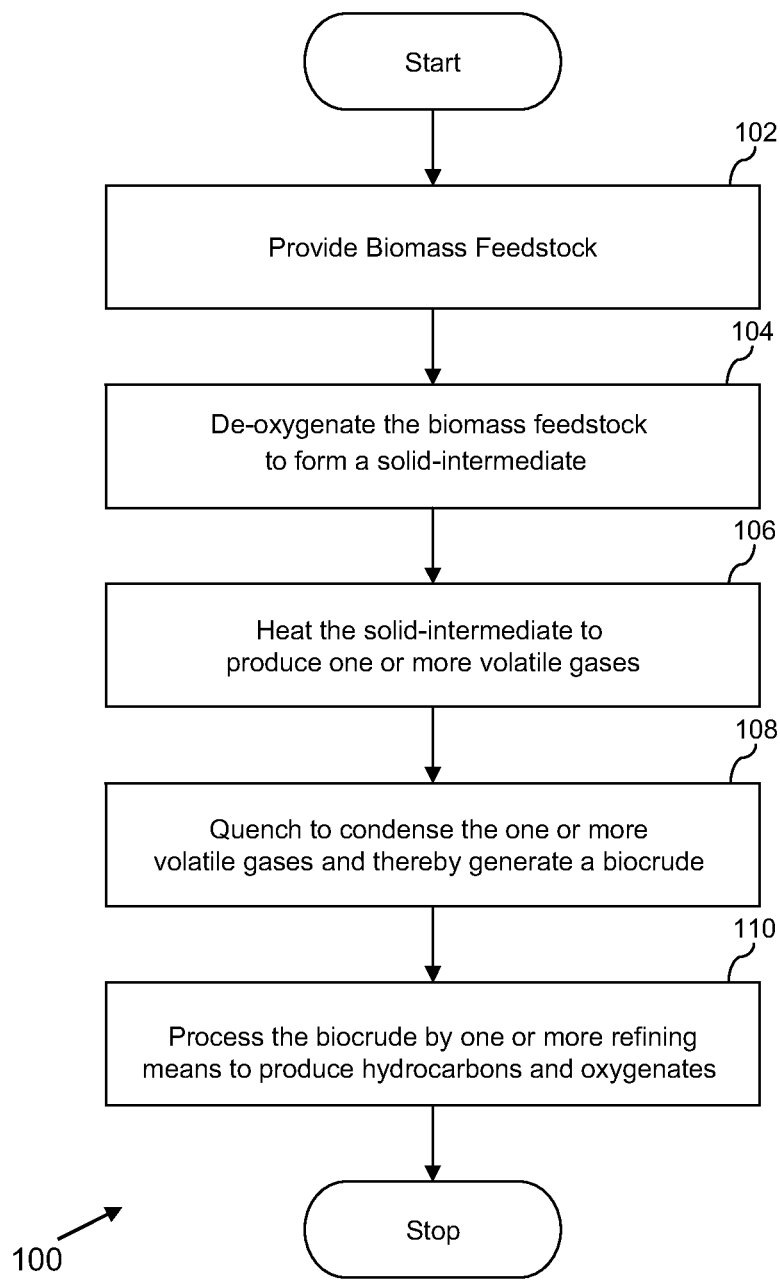
FIG. 1 is a flowchart of a process of processing biomass to hydrocarbons and oxygenates, according to an exemplary embodiment of the present invention.

FIG. 1 is a flowchart 100 that describes a process for processing biomass. At step 102, a biomass feedstock is provided. Examples of biomass feedstock may include, but not limited to, lignocellulosic biomass. Lignocellulosic biomass refers to plant biomass that may be composed of cellulose, hemicellulose, and lignin. Cellulose and hemicellulose are carbohydrate polymers. The carbohydrate polymers are tightly bound to the lignin. Lignocellulosic biomass may be grouped into four main categories: (1) agricultural residues, (2) dedicated energy crops, (3) wood residues, and (4) municipal solid waste. The agricultural residues may include, but not limited to, corn stover, wheat straw and sugarcane bagasse. Many energy crops may also be of interest for their ability to provide high yields of biomass and may be harvested multiple times each year. These may include, but not limited to, poplar trees, switchgrass, and miscanthus giganteus. The premier energy crop is sugarcane, which is a source of the readily fermentable sucrose and the lignocellulosic side product bagasse. The wood residues may include, but are not limited to, sawmill and paper mill discards.

In an embodiment of the present invention, the biomass feedstock may undergo a pre-treatment process. The pre-treatment process may involve impregnating the biomass feedstock with one or more metallic salts. The metallic salts may include, but are not limited to, salts of transition metals from groups 3-to-12; i.e., hydroxides, halides, carbonates, nitrates, and carboxylates. Other metallic salts include those of metals of groups 1 and 2 of the periodic table, i.e., hydroxides, halides, nitrates, carbonates and carboxylates, among others. In various embodiments of the present invention, the pretreatment process is carried out in a range from atmospheric pressure to 500 psi and at a temperature in a range from about 20° C. to 150° C. In an embodiment of the present invention, the metallic salts may act as catalytic agents for various chemical processes that the biomass feedstock may undergo such as, but not limited to, de-oxygenation, hydrogenation, and oxygen/hydrogen rearrangement reactions.

Further, at step 104, the biomass feedstock may undergo de-oxygenation. In an embodiment of the present invention, the de-oxygenation process may be carried out by thermal de-oxygenation. The de-oxygenation may eliminate one or more oxygen containing species from the biomass feedstock to generate a solid intermediate. The one or more oxygen containing species may include, but are not limited to, one or more of water, carbon monoxide (CO), carbon dioxide ($CO_2$) and ethanoic acid ($CH_3COOH$). In an embodiment of the present invention, the de-oxygenation may be carried out at a pressure in the range from about 1.4 psi to about 2500 psi. In another embodiment of the present invention, the de-oxygenation is carried out at a pressure in the range from about 1 atm (14.7psi) to about 50 atm (735psi). Further, the temperature range for the de-oxygenation is in the range from about 150° C. to about 500° C. In an alternative embodiment of the invention, the temperature is in the range from about 150° C. to about 250° C.

In an embodiment of the invention the de-oxygenation step is carried out in an atmosphere that may include one or more gases. Gases may include, but not limited to, hydrogen, syn-gas (CO+H2), nitrogen, steam/water, ammonia, methane, ethane, propane, butane, pentane, and natural gas. In another embodiment of the invention, the de-oxygenation process may be carried out in a gaseous atmosphere containing a concentration of oxygen in the range from about 0.5 mol % to about 5 mol%. In an embodiment of the invention, the de-oxygenation process may be carried out in a gaseous atmosphere containing a concentration of oxygen in the range from about 0 mol % to about 1.0 mol%.

The de-oxygenation process may further decompose one or more carbohydrates present in the biomass feedstock. For example, if the biomass is lignocellulosic biomass, the carbohydrate polymers cellulose and hermicellulose may be decomposed and/or undergo chemical transformations. In an embodiment of the present invention, the transformation of carbohydrates may also lead to formation of monomeric carbohydrates such as, but not limited to, xylose, glucose, fructose, or their derivatives such as furfural, hydroxymethyl furfural, and levulinic acid.

Further, the de-oxygenation process may help in biomass densification, stabilization and transportation. For example, any farmer collecting the biomass feedstock may carry out the initial biomass pre-treatment and thermal de-oxygenation process. Further, eliminating oxygen containing species may allow for densification of the biomass feedstock and also the de-oxygenation leads to biomass stabilization as a fraction of carbohydrates are decomposed/transformed during de-oxygenation. Moreover, decomposition/transformation of the carbohydrates from the biomass feedstock may limit the possibility that various living organisms may use the de-oxygenated biomass feedstock as food and improve long term storage stability.

At step 106, the solid-intermediate is heated to produce one or more volatile gases. In an embodiment of the present invention, the solid intermediate is heated at a temperature in a range from about 250° C. to 1000° C. In another embodiment of the present invention, the solid-intermediate is heated at a temperature in a range from about 450° C. to about 750° C. In an embodiment of the invention, the solid-intermediate is heated in the presence of an inert gas and in the absence of oxygen. In an exemplary embodiment, the inert gas may be, but not limited to, nitrogen. In another embodiment of the invention, the solid-intermediate is heated in the presence of an inert gas and oxygen. The concentration of oxygen is in the range from about 0.0 mol % to about 0.5 mol %. In yet another embodiment of the invention, the solid-intermediate is heated in the presence of hydrogen or a hydrogen donor compound. The solid-intermediate may be heated in the presence of a mixture of hydrogen, hydrogen donor compound, an inert gas, and/or hydrocarbon. The hydrogen donor compound, hydrogen and/or hydrocarbon present may create a reducing atmosphere and quenches the unstable radical species formed during heating of the solid intermediate. When using a hydrogen donor compound or hydrocarbon, mass ratios for de-oxygenated intermediate to hydrogen donor compound or hydrocarbon may be in the order of 0.1-to-2. Further, a catalyst may be introduced to promote hydrogenation/hydrogenolysis reactions during heating. The catalyst may also play the role of heat transfer media. Catalysts include, but are but limited to, those conventionally used in hydroprocessing of hydrocarbons, e.g., those based on metals such as Co, Ni, Mo, W. In an embodiment of the present invention, the catalyst is fed with the solid intermediate reactant. In an embodiment of the present invention, the solid intermediate and the catalyst may be mixed prior to heating. The catalyst can also be fed separately from the biomass. The catalyst in the latter case serves as the heat exchange media for the volatilization of the solid intermediate. During heating, the solid intermediate undergoes thermal cracking Further de-oxygenation reactions take place. Common de-oxygenation reactions taking place include dehydration, decarboxylation, and decarbonylation. When heating is carried out in a reducing atmosphere in presence or absence of a catalyst hydrogenation/hydrogenolysis reactions also take place. Other reactions occurring that give rise to larger molecular species include condensation reactions, such as Aldol condensation, ketonic decarboxylation and other condensation reactions known to form new C—C bonds. Oligomerization reactions involving unsaturated compounds can also occur during the heating step.

At step 108, the one or more volatile gases are rapidly quenched and condensed to generate a mixture of hydrocarbons and oxygenates. The mixture generated by condensation of these volatile gases is generally termed as biocrude. In an embodiment of the present invention, the quenching may be carried out at a pressure in the range from about 1.4 psi to about 100 psi and at a temperature in a range from about –20° C. to about 80° C. The biocrude is made of a mixture of several organic compounds. Organic compounds in the biocrude include hydrocarbons, alcohols, ketones, aldehydes, carboxylic acids, phenolics, and water. Depending on the degree of deoxygenation achieved and the components of the heating atmosphere three or four product phases are obtained, i.e., solid, liquid and gas. The solid phase is composed mainly of char and used catalyst, if the latter is used. The gas phase contains mainly carbon oxides and light hydrocarbons. The liquid phase may be one or two phases. When two phases are formed, one phase is mainly aqueous with some polar organics dissolved. The other phase has a lower concentration of water and is mainly a mixture of organic compounds, such as those named above. Separation of the organic phase can be carried out by decantation when two separated liquid phases are obtained. In an embodiment of the invention, the gases can be used for hydrogen production using conventional technologies as described in that art.

At step 110, the biocrude is processed by one or more refining means to produce one or more hydrocarbons that may be directly used as biofuels or in blends with conventional fuels such as gasoline and diesel. The one or more refining means may include, but are not limited to, hydrotreating, fluidized catalytic cracking, hydro-cracking and coking A person who is ordinarily skilled in the art may appreciate that the refining may be carried by any known methods and the examples provided in the application do not limit the scope of the present invention.

Figure 2:
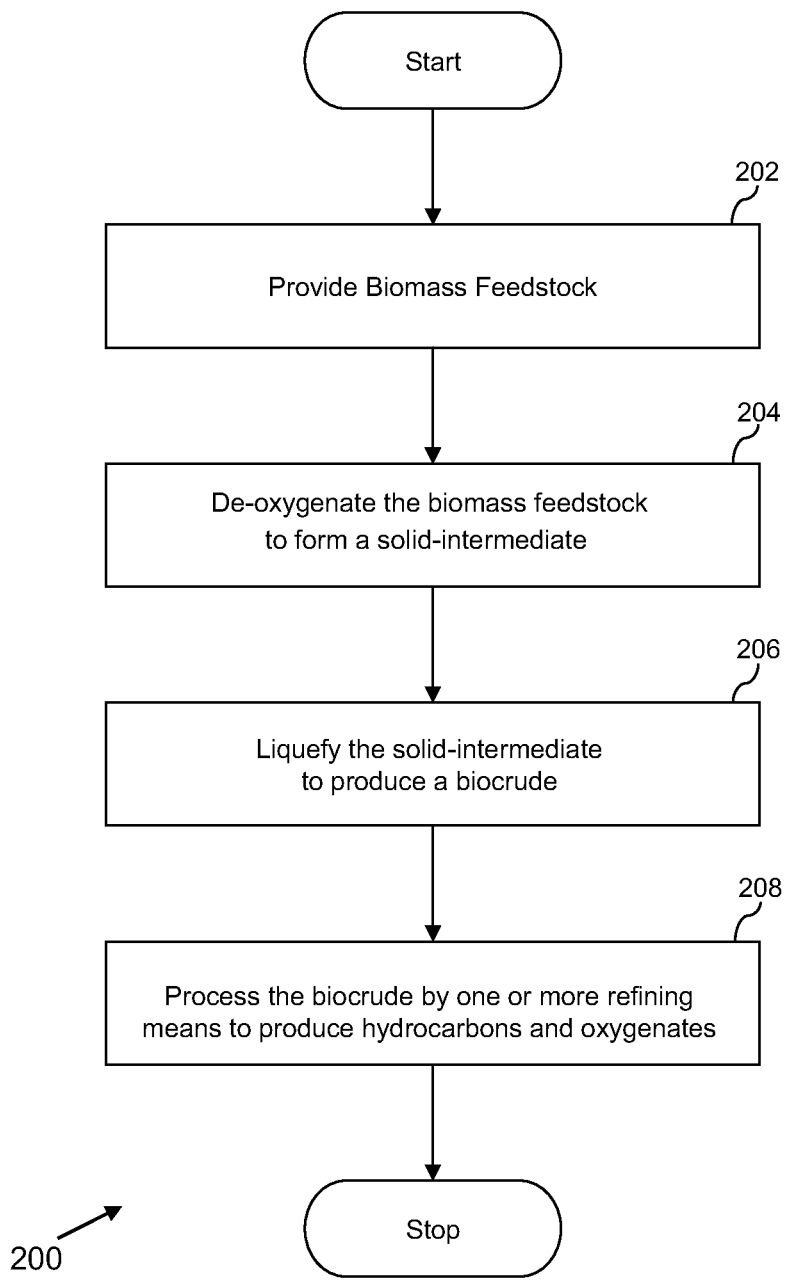
FIG. 2 is a flowchart of a method of processing biomass to hydrocarbons and oxygenates, according to another exemplary embodiment of the present invention.

FIG. 2 is a flowchart 200 that describes a process for processing biomass. At step 202, a biomass feedstock is provided. Examples of biomass feedstock may include, but are not limited to, lignocellulosic biomass. Lignocellulosic biomass refers to plant biomass that may be composed of cellulose, hemicellulose, and lignin. Cellulose and hemicellulose are carbohydrate polymers. The carbohydrate polymers are tightly bound to the lignin. Lignocellulosic biomass may be grouped into four main categories: (1) agricultural residues, (2) dedicated energy crops, (3) wood residues, and (4) municipal solid waste. The agricultural residues may include, but are not limited to, corn stover and sugarcane bagasse. Many energy crops may also be of interest for their ability to provide high yields of biomass and may be harvested multiple times each year. These may include, but are not limited to, poplar trees, switchgrass, and miscanthus giganteus. The premier energy crop is sugarcane, which is a source of the readily fermentable sucrose and the lignocellulosic side product bagasse. The wood residues may include, but are not limited to, sawmill and paper mill discards.

In an embodiment of the present invention, the biomass feedstock may undergo a pre-treatment process. The pre-treatment process may involve impregnating the biomass feedstock with one or more metallic salts. The metallic salts may include, but not limited to, salts of transition metals from groups 3-to-12; i.e., hydroxides, halides, carbonates, nitrates, and carboxylates. Other metallic salts include those of metals of groups 1 and 2 of the periodic table, i.e., hydroxides, halides, nitrates, carbonates and carboxylates, among others. In various embodiments of the present invention, the pretreatment process is carried out in at a pressure in a range from atmospheric pressure to 500 psi and at a temperature in a range from about 20° C. to 150° C. In an embodiment of the present invention, the metallic salts may act as catalytic agents for various chemical processes that the biomass feedstock may undergo such as, but not limited to, de-oxygenation, hydrogenation, and oxygen/hydrogen rearrangement reactions.

Further, at step 204, the biomass feedstock may undergo de-oxygenation. In an embodiment of the present invention, the de-oxygenation process maybe carried out by thermal de-oxygenation. The de-oxygenation may eliminate one or more oxygen containing species from the biomass feedstock to generate a solid intermediate. The one or more oxygen containing species may include, but are not limited to, one or more of water, carbon monoxide (CO), carbon dioxide ($CO_2$) and ethanoic acid ($CH_3COOH$). In an embodiment of the present invention, the de-oxygenation may be carried out at a pressure in the range from about 1.4 psi to about 2500 psi. In another embodiment of the present invention, the de-oxygenation is carried out at a pressure in the range from about 1 atm to about 50 atm. Further, the temperature range for the de-oxygenation is in the range from about 150° C. to about 250° C. In an alternative embodiment of the invention, the temperature is in the range from about 150° C. to about 500° C.

In an embodiment of the invention the de-oxygenation step is carried out in an atmosphere that may include one or more gases. Gases may include, but not limited to, hydrogen, syngas (CO+H2), nitrogen, steam, ammonia, methane, ethane, propane, butane, pentane, and natural gas. In another embodiment of the invention, the de-oxygenation process may be carried out in a gaseous atmosphere containing concentration of oxygen in the range from about 0.5 mol % to about 5 mol %. In an embodiment of the invention, the de-oxygenation process may be carried out in a gaseous atmosphere containing concentration of oxygen in the range from about 0 mol % to about 1.0 mol %.

The de-oxygenation process may further decompose one or more carbohydrates present in the biomass feedstock. For example, if the biomass is lignocellulosic biomass, the carbohydrate polymers cellulose and hemicellulose may be decomposed and/or undergo chemical transformations. In an embodiment of the present invention, the transformation of carbohydrates may also lead to formation of monomeric carbohydrates such as, but limited to, xylose, glucose, fructose, or their derivatives such as furfural, hydroxymethyl furfural, and levulinic acid.

Further, the de-oxygenation process may help in biomass densification, stabilization and transportation. For example, any farmer collecting the biomass feedstock may carry out the initial biomass pre-treatment and thermal de-oxygenation process. Further, eliminating oxygen containing species may allow for densification of the biomass feedstock and also the de-oxygenation leads to biomass stabilization as a fraction of carbohydrates are decomposed/transformed during de-oxygenation. Moreover, decomposition/transformation of the carbohydrates from the biomass feedstock may limit the possibility that various living organisms may use the de-oxygenated biomass feedstock as food and improve long term storage stability.

At step 206, the solid-intermediate is liquefied to produce a mixture of hydrocarbons and oxygenates, which is generally termed as biocrude. In an embodiment of the present invention, the liquefaction is carried out at a pressure in a range from about 50 atm to 300 atm. In another embodiment of the invention, the liquefaction is carried out at a pressure in a range from about 80 atm to 200 atm.

In an embodiment of the present invention, the liquefaction is carried out at a temperature in a range from about 250° C. to 500° C. In another embodiment of the invention, the liquefaction is carried out at a temperature in a range from about 250° C. to 400° C.

In an embodiment of the invention, the liquefaction utilizes one or more solvents. The one or more solvents may include, but not limited to, one or more of hydrogen donor solvent, tetralin, naphthenic concentrate, hydrotreated light cycle oil, and recycle biocrude. Other hydrogen donor solvents may include, but not limited to, low molecular weight alcohols. Further, the liquification may utilize water as a co-solvent. Solvents with hydrogen donor properties help deoxygenation reactions taking place during high pressure liquefaction. Hydrogen donor solvents also help stabilize intermediate species formed during high pressure liquefaction.

In an embodiment of the invention the liquefaction step is carried out in an atmosphere that may include one or more gases. Gases may include, but are not limited to, hydrogen, syn-gas (CO+H2), nitrogen, steam, ammonia, methane, ethane, propane, butane, pentane, and natural gas.

In an embodiment of the invention, the liquefaction utilizes one or more of iron based catalysts, copper based catalysts, nickel based catalysts, tungsten based catalysts, molybdenum base catalysts, cobalt based catalysts, inorganic salts, oxides and carbonates to promote decarboxylation, oxygen rearrangement reactions, hydrogenation, and hydrogenolysis reactions.

In another embodiment of the invention, one or more of the inorganic salts, oxides, or carbonates may be added during the liquefaction process. During liquefaction, the solid intermediate undergoes thermalcracking Further de-oxygenation reactions take place. Common de-oxygenation reactions taking place include dehydration, decarboxylation, and decarbonylation. When liquefaction occurs in a reducing media in presence or absence of a catalyst hydrogenation/hydrogenolysis reactions also take place. Other reactions occurring that give rise to large molecular species include condensation reactions, such as Aldol condensation, ketonic decarboxylation and other condensation reactions known to form new C—C bonds. Oligomerization reactions involving unsaturated compounds can also occur during liquefaction.

Liquefaction results in the formation of a biocrude, which is a liquid product consisting of hydrocarbons and oxygenates. A solid residue is also produced. The solid residue may include, but is not limited to, carbonaceous material, inorganic salts and oxides, and solid catalyst. A gas is also formed. The gas comprises mainly carbon oxides, and light hydrocarbons. The biocrude is a mixture of several organic compounds including hydrocarbons, alcohols, ketones, aldehydes, phenolics and carboxylic acids. An aqueous phase may also form or is always present when using water as a co-solvent. The aqueous phase contains some polar oxygenates and some salt residues. The aqueous phase can be separated from the biocrude by decantation.

At step 208, the biocrude is processed by one or more refining means to produce hydrocarbons that may be directly used as biofuels or in blends with conventional fuels such as gasoline and diesel. The one or more refining means may include, but not limited to, hydro-treating, fluidized catalytic cracking, hydro-cracking and coking A person who is ordinarily skilled in the art may appreciate that the refining may be carried by any known methods and the examples provided in the application do not limit the scope of the present invention.

Residence times for liquefaction may vary between 3-60 min. Different reactor configurations can be used during liquefaction. They include, but are not limited to, batch, CSTR, fixed bed, moving bed, and slurry reactors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the appended claims of the present invention.

What is claimed is:

1. A process for processing biomass to hydrocarbons and oxygenates, the process comprising:
   a. providing a biomass feedstock;
   b. de-oxygenating the biomass feedstock to form a solid-intermediate in a gaseous atmosphere containing a component selected from the group consisting of nitrogen, hydrogen, carbon monoxide, methane, ethane, propane, butane, pentane and any combination thereof;
   c. liquefying the solid-intermediate to produce a biocrude; and
   d. processing said biocrude by one or more refining means to produce one or more hydrocarbons.

2. The process of claim 1 wherein said one or more refining means is selected from the group consisting of hydro-treating, fluid catalytic cracking, hydro-cracking, coking, and any combination thereof.

3. The process of claim 1 wherein said biomass feedstock is impregnated with metallic salts, and wherein said metallic salt is selected from the group consisting of salts of transition metals from groups 3-12 metals, metals from group 1 and 2, and any combination thereof.

4. The process of claim 1 wherein said biomass feedstock is impregnated with metallic salts under a pressure range from atmospheric pressure to 500 psi and a temperature range from 20° to 150°.

5. The process of claim 1 wherein said biomass feedstock is a lignocellulosic biomass.

6. The process of claim 1 wherein said step b is carried out at a pressure in the range from about 1.4 psi to about 2500 psi, and a temperature in the range from about 150° C. to about 500° C.

7. The process of claim 1, wherein said step b is carried out by a thermal de-oxygenation process.

8. The process of claim 1, wherein the concentration of oxygen in step b is in the range from about 0.5 mol % to about 5 mol %.

9. The process of claim 1, wherein said step c is carried out at a pressure in a range from about 50 atm to 300 atm, and wherein said step c is carried out at a temperature in a range from about 250° C. to 500° C.

10. The process of claim 1, wherein said step c is carried out at a pressure in a range from about 80 atm to 200 atm.

11. The process of claim 1, wherein said step c is carried out using one or more solvents, wherein said one or more solvents is selected from the group consisting of hydrogen donor solvent, tetralin, naphthenic concentrate, hydrotreated light cycle oil, water, recycle biocrude, and any combination thereof.

12. The process of claim 1, wherein said step c is carried out in the presence of one or more catalyst, wherein said one or more catalyst is selected from the group consisting of Fe—, Cu—, W—, Co, Mo, Ni— based catalyst, and any combination thereof.

13. The process of claim 1, wherein said step c is carried out using one or more catalyst, wherein said one or more catalyst is selected from the group consisting of inorganic salts, oxides, carbonates, and any combination of these compounds from group I and II metals from the periodic table of elements.

14. A process for processing biomass to hydrocarbons and oxygenates, the process comprising:
   a. providing a biomass feedstock;
   b. de-oxygenating the biomass feedstock to form a solid-intermediate in a gaseous atmosphere containing a component selected from the group consisting of nitrogen, hydrogen, carbon monoxide, methane, ethane, propane, butane, pentane and any combination thereof;
   c. heating said solid-intermediate from step b to produce one or more volatile gases;
   d. quenching to condense said one or more volatile gases thereby generating a biocrude; and
   e. processing said biocrude by one or more refining means to produce one or more hydrocarbons.

15. The process of claim 14,
   wherein said step c is carried out at a temperature in a range from about 250° C. to 1000° C.;
   wherein said step c is carried out in the presence of an inert gas and oxygen, wherein the concentration of said oxygen is in the range from about 0.0 mol % to about 0.5 mol %.

16. The process of claim 14, wherein said step c is carried out in the presence of a member selected from a group consisting of hydrogen, hydrogen donor compound, an inert gas, hydrocarbon, and any combination thereof.

17. The process of claim 14, wherein said step c is carried out in the presence of a catalyst, and wherein said catalyst is selected from a group consisting of deoxygenation catalyst, hydrogenation catalyst, isomerization catalyst, cracking catalyst, and any combination thereof.

18. The process of claim 14, wherein said step c is carried out in the presence of a catalyst, and wherein said catalyst is hydroproccessing catalyst based on metals selected from a group consisting of Co, Ni, Mo, W, and any combination thereof.

19. The process of claim 14, wherein said step d is carried out at a pressure in the range from about 1.4 psi to about 100 psi; and wherein said step d is carried out at a temperature in the range from about −20° C. to about 80° C.

20. The process of claim 14 wherein said one or more refining means is selected from the group consisting of hydrotreating, fluid catalytic cracking, hydro-cracking, coking, and any combination thereof.

21. The process of claim 14 wherein said biomass feedstock is impregnated with metallic salts, and wherein said metallic salt is selected from the group consisting of salts of transition metals from groups 3-12 metals, metals from group 1 and 2, and any combination thereof.

22. The process of claim 14 wherein said biomass feedstock is impregnated with metallic salts under a pressure range from atmospheric pressure to 500 psi and a temperature range from 20° to 150°.

23. The process of claim 14 wherein said biomass feedstock is a lignocellulosic biomass.

24. The process of claim 14 wherein said step b is carried out at a pressure in the range from about 1.4 psi to about 2500 psi, and a temperature in the range from about 150° C. to about 500° C.

25. The process of claim 14, wherein said step b is carried by a thermal de-oxygenation process.

26. The process of claim 14, wherein the concentration of said oxygen is in the range from about 0.5 mol % to about 5 mol %.

* * * * *